United States Patent [19]

Meier zu Koecker et al.

[11] Patent Number: 4,528,170

[45] Date of Patent: Jul. 9, 1985

[54] WASTE GAS TREATMENT PROCESSES

[75] Inventors: Heinz Meier zu Koecker, Berlin; Robert Walter, Muehlheim; Torsten Schmidt, Berlin, all of Fed. Rep. of Germany

[73] Assignee: Kali-Chemie Aktiengesellschaft, Hanover, Fed. Rep. of Germany

[21] Appl. No.: 473,149

[22] Filed: Mar. 7, 1983

[30] Foreign Application Priority Data

Mar. 12, 1982 [DE] Fed. Rep. of Germany ....... 3208767

[51] Int. Cl.³ ............................................. B01D 53/36
[52] U.S. Cl. .................... 423/245; 423/210; 423/247
[58] Field of Search ............... 423/245 R, 245 S, 247, 423/213.7, 210 C

[56] References Cited

U.S. PATENT DOCUMENTS 3,690,840  9/1972  Volker ........................... 423/210 C
3,988,423  10/1976  Ohrui et al. ...................... 423/236
4,330,513  5/1982  Hunter et al. ..................... 423/245

Primary Examiner—Earl C. Thomas
Assistant Examiner—Jeffrey E. Russel
Attorney, Agent, or Firm—Schwartz, Jeffery, Schwaab, Mack, Blumenthal & Evans

[57] ABSTRACT

Disclosed is a process for the treatment of exhaust gas comprising a heating step using an external energy source which partially oxidizes the exhaust gas and a subsequent catalytic treating step.

11 Claims, 2 Drawing Figures

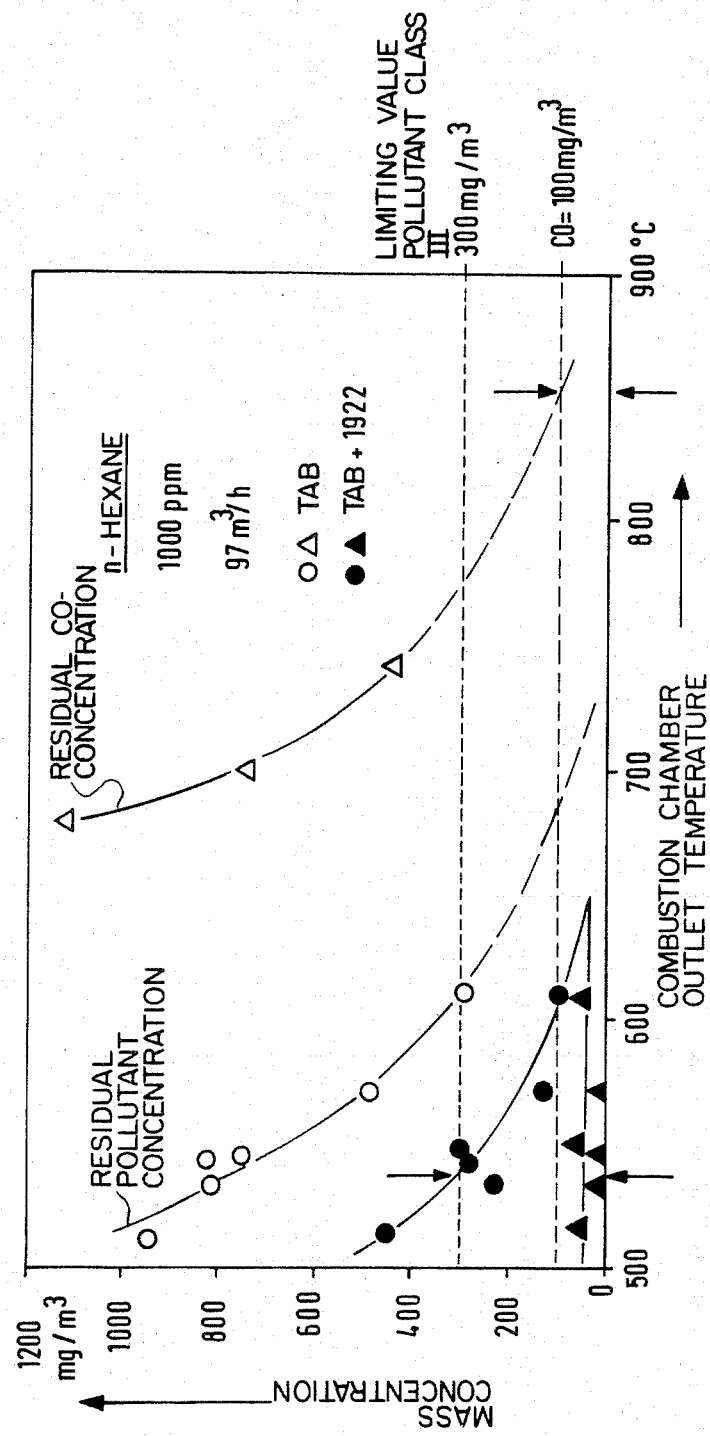
FIG. 2 TEMPERATURE DEPENDENCE OF THE PRIMARY POLLUTANT RESIDUAL CONCENTRATION AND THE CO INTERMEDIATE PRODUCT RESIDUAL CONCENTRATION WITHOUT AND WITH EXTERNAL CATALYTIC CO POST-OXIDATION.

WASTE GAS TREATMENT PROCESSES

BACKGROUND OF THE INVENTION

The present invention relates to a treatment process for reducing the pollutant concentration in waste gases, particularly by oxidation.

A known process for the oxidative decomposition of pollutants in exhaust gas is thermal afterburning (TAB).

A series of fundamental investigations of the TAB of pollutants shows that in the majority of applications, the TAB-installation must be designed in accordance with the oxidation conditions of the intermediate products (secondary pollutants), particularly carbon monoxide (CO) and that correspondingly high operating temperatures, substantially in excess of 750° C., are required.

In particular, in the case of pollutants of Emission Class III of the Technische Anleitung zur Reinhaltung der Luft (Technical Guidelines for the Purification of Air)—hereafter "TALuft", the permissible residual concentrations of the primary pollutants (300 mg/m$^3$) is attained already at temperatures between about 500° and 600° C., while a permissible CO residual concentration of a maximum of 100 mg/m$^3$ (normal m$^3$) is attained only at temperatures above 800° C.

These conditions become more severe in actual practice when deposits are precipitated over time on the wall of combustion chambers, thus inhibiting the CO oxidation and consequently requiring even higher temperatures for the treatment of the exhaust gases.

In order to eliminate secondary pollutants, it is thus necessary to treat the exhaust gas at substantially higher temperatures than those required for the elimination of the primary pollutants. This requirement renders the conventional treatment of exhaust gases significantly more expensive, both from a technical and an economical standpoint.

SUMMARY OF THE INVENTION

It is therefore an object of the present invention to provide an exhaust gas treatment process which limits the emission of pollutants to the permissible range.

Another object of the present invention is to attain the above object at lower processing temperatures.

Yet another object of the present invention is to achieve the above objects by means of a process which is technically and economically superior to the conventional processes.

It is also an object of the invention to provide a means for easily improving the performance of existing TAB devices.

In accordance with one aspect of the present invention, there is provided a process for the treatment of exhaust gas to reduce the pollutant concentration by means of oxidation, comprising the steps of heating the exhaust gas to at least 540° C. by external energy to partially oxidize the gas, and catalytically treating the gas with a precious metal catalyst. The process can further comprise the step of recovering the heat from the heated exhaust gas. This optionally can be done before, after or both before and after the catalytic treatment step.

In a preferred embodiment, the heating step comprises thermal afterburning.

Other objects, features and advantages of the present invention will become apparent from the detailed description of preferred embodiments which follows, when considered together with the attached figures of drawing.

BRIEF DESCRIPTION OF THE DRAWINGS

FIG. 2 is a graph comparing the results of the present invention with those of the known process.

DETAILED DESCRIPTION OF PREFERRED EMBODIMENTS

Figure 1:
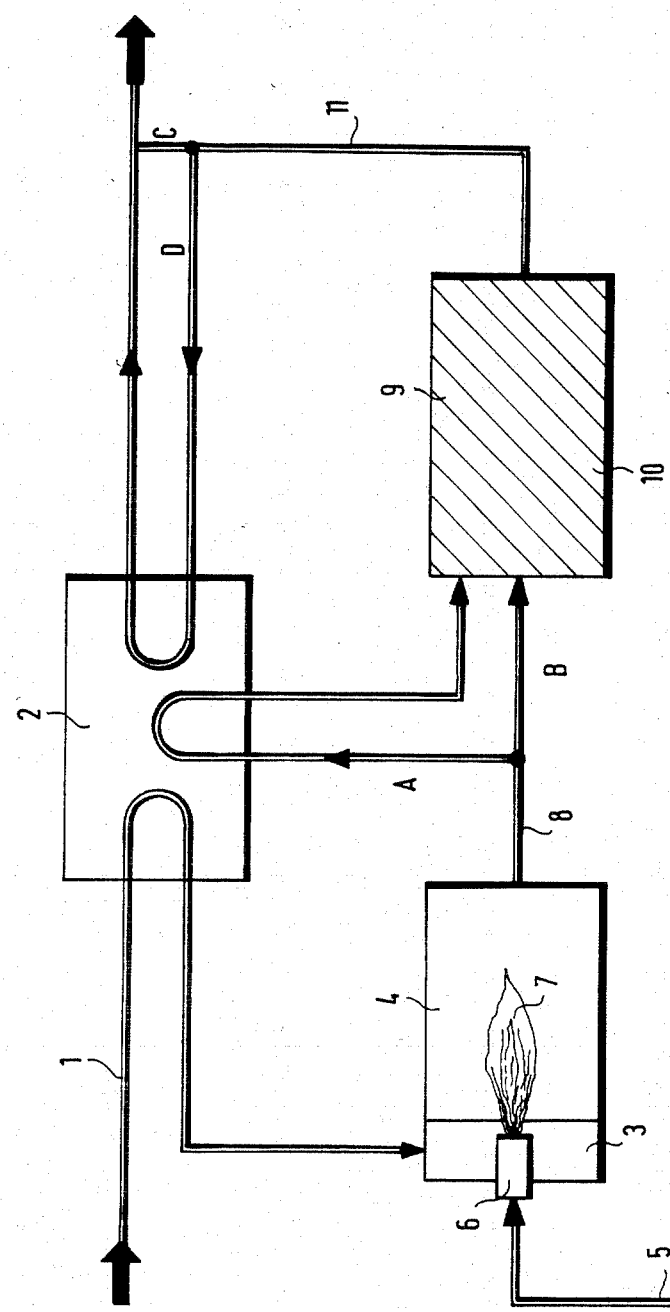
FIG. 1 is a schematic diagram of an apparatus for carrying out the process of the present invention.

The exhaust gas treating process according to the invention represents a two-stage process.

In a first stage the pollutant containing exhaust gas is heated with the use of external energy and is partially oxidized. This first stage preferably consists of a conventional thermal afterburning process.

The flow of gas leaving the first stage, which in the conventional process already constitutes the purified gas, is catalytically treated in a second stage. In a preferred variant, there is provided a heat recovery step before and/or after the second stage.

Commercially available oxidizing catalysts are used as the catalysts. They may be used in any of their known forms, for example, as webs, nets or sieves or as a bed of unshaped or shaped particles. Catalysts based on metal oxides and/or precious metals and attached to porous supports are preferred. The support is preferably in the form of beads, extruded pellets or honeycomb bodies. Such catalysts are commercially available.

The process according to the invention is suitable for treatment of exhaust gases comprising different primary pollutants. In particular, one or several of the following substances may be present as primary pollutants:

saturated aliphatic hydrocarbons, e.g., n-hexane, n-octane;

unsaturated aliphatic hydrocarbons, e.g., ethylene, butadiene;

aromatic hydrocarbons, e.g., benzene, toluene, xylene, styrene, ethyl-benzene;

mixtures of aliphatic and/or aromatic and/or naphthenic hydrocarbons, such as, e.g., solvents based on gasoline or terpentine;

aliphatic alcohols with one or more hydroxyl groups, such as, e.g., methanol, ethanol, n-propanol, isopropanol, n-butanol, diacetone alcohol, ethylene glycol, propylene glycol;

hydroxy substituted aromatics, such as, e.g., phenols, cresols;

ethers, such as, e.g., alkyl glycols (methyl-, ethyl-, propyl-, butyl glycol), cyclic ethers (ethylene-, propylene oxide);

aldehydes, such as, e.g., formaldehyde, acetaldehyde;

ketones, such as, e.g., acetone, methylethylketone, cyclohexanone;

esters, such as, e.g., glycerides, esters of acetic acid (preferably methyl, ethyl or n-butyl ester); and organic acids or their anhydrides, such as, e.g., formic acid, acetic acid, phthalic acid anhydride, maleic acid anhydride.

From such primary pollutants, there are formed secondary pollutants by partial oxidation, such as, for example, formaldehyde or acetaldehyde, and particularly carbon monoxide (CO). The process according to the invention makes it possible to effectively limit, in particular, the secondary pollutant content.

A particular variant of the process according to the invention resides in the technical and economical improvement of existing, single stage exhaust gas treating installations, in which exhaust gas is purified and heated with the use of external energy in a single stage. This is accomplished by treating the exhaust gas in the existing stage with a reduced supply of energy and subsequently treating the resulting gas flow in a catalytic manner. The already existing stage is preferably a thermal afterburning installation.

Substantial advantages are obtained by the process according to the invention, for example:

(a) a reduction in the use of external energy in the first stage. This leads on the one hand to a significant cost reduction, which, in combination with a process-controlled temperature regulation, may amount to 50% of the cost of the energy heretofore applied in the first stage of conventional processes. Furthermore, the reduction in temperature permits the use of less expensive construction materials.

(b) an increased flow rate. Residence time effects, such as those known in thermal afterburning installations, are no longer detrimental due to the subsequent catalytic treatment step. Compared with such known installations, higher exhaust gas and/or pollutant flow rates are obtained with lower operating temperatures and equally good combustion.

By re-equipping existing installations according to the present invention, it is possible, for example, to expand production without the need for the installation of a completely new exhaust gas treatment plant.

(c) Reorganization of existing installations. Existing installations which no longer satisfy regulations or do so only at a high cost can be adapted to legal requirements while avoiding large investments.

Referring now to the drawings, the apparatus of the present invention is shown schematically in FIG. 1. The exhaust gas to be purified is conducted through a line 1 by way of a heat exchanger 2 into a prechamber 3, from which it passes into a first exhaust gas treatment stage 4. In this example, the gas treatment stage comprises a combustion chamber having a volume of about 275 liters. Fuel, comprising a mixture of propane and air, is supplied to the gas treatment stage 4 by means of a supply line 5 and burner nozzle 6 and burns therein in an open flame 7. The resultant gas mixture containing primary and secondary pollutants is passed through the line 8/A to the heat exchanger 2 and from there to the second exhaust gas treatment stage 9 having therein a catalyst 10. Alternatively, the gas leaving the combustion chamber through the line 8 can be conducted through line 8/B into the second stage 9, thereby bypassing the heat exchanger. The catalytically aftertreated gas (purified gas) is passed through the line 11/C to the exhaust stack (not shown). Alternatively, the pure gas leaving the second stage 9 can be conducted through the line 11/D to the exchanger 2 to recapture its heat in case of a sufficiently high heat content. The heat which is recaptured as the pure gas is cooled can then be used to preheat the waste gas to be purified.

The following non-limiting examples describe the present invention in more detail. Utilizing the above-described process and apparatus, air with the addition of about 1000 ppm n-hexane as the pollutant was used as the waste gas. The flow rate of the waste gas varied between about 70 and 100 Nm$^3$/h (normal-m$^3$/h), with a space velocity of about 20,000 liters per hour per liter of the catalyst.

Bulk or bed catalysts were used in the case in which n-hexane was the pollutant. The catalyst was comprised of a KCO-1922 K/M type, an oxidizing catalyst of the palladium/manganese type on an Al$_2$O$_3$ support, and a KCO-3366 K/M catalyst, an oxidizing catalyst containing platinum as the active component. Both catalysts are commercially available from Kali-Chemie AG. In other examples, the honeycomb catalyst KCO-WK-220 ST, a platinum oxidizing catalyst also produced by Kali-Chemie, was used as the catalyst.

Samples were taken before and after the second stage 9 for analysis of the gaseous mixtures.

The measured results of two series of experiments with n-hexane as the pollutant are shown in FIG. 2. The pollutant concentration is represented as a function of the combustion chamber outlet temperature along the abscissa of the coordinate system. When using TAB alone, i.e., the known process illustrated by the outlined circles and triangles, the limiting value for the pollutant in accordance with Pollutant Class III was established to be approximately 610° C. In order to satisfy pertinent regulations of the "TALuft", however, it was necessary to operate the TAB at approximately 860° C. due to the high CO concentrations. The process according to the invention, represented by the darkened circles and triangles, in contrast, permitted operation at 600° C. Furthermore, while recording the residual CO concentration, it was possible to lower the temperature of the combustion chamber to approximately 540° C., since even at this temperature the primary and secondary pollutants do not exceed the permissible total emission limiting value of 300 mg/m$^3$ and the permissible emission limiting value of 100 mg/m$^3$ for carbon monoxide. A temperature reduction of up to 320° C. is therefore possible with the process of the invention.

The following tables represent a compilation of the results of further experimentation. The cumulative composition of the pure gas, wherein 100 corresponds to the total carbon content in the pollutant employed, is given as a function of the outlet temperature (TBK,a) of the combustion chamber, both for the known process (TAB) and for the process according to the invention (TAB/CAB). The prevailing experimental parameters are listed following the tables. The abbreviations used in the tables have the following meaning.

S=pollutant, IP=carbon containing, organic intermediate products, for example formaldehyde.

While still complying with the specifications of "TA-Luft", the results indicate that it was possible to lower the temperature of the combustion chamber in each case from over approximately 800° C. to 600° C. (Table 1) or to 570° C. (Table 2) or to 480° C. (Table 3) by use of the present invention, using the subsequent catalytic treatment. Further data reflecting similar results are contained in the remaining tables.

A comparison of Table 1 and 2 shows that, in the conventional process, an increase in the flow rate necessarily results in a significant increase in the temperature of the combustion chamber, while in the process according to the invention, it is possible to operate at the same temperature.

TABLE 1

| TBK, a [°C.] | Oxidation of n-hexane | | | | | | | |
|---|---|---|---|---|---|---|---|---|
| | TAB | | | | TAB/CAB | | | |
| | S | IP | CO$_2$ | CO | S | IP | CO$_2$ | CO |
| 500 | 41 | 30 | 12 | 17 | 19 | 0 | 79 | 2 |
| 550 | 30 | 18 | 19 | 33 | 12 | 0 | 86 | 2 |
| 600 | 22 | 12 | 26 | 40 | 7 | 0 | 91 | 2 |
| 650 | 16 | 10 | 36 | 38 | 5 | 0 | 93 | 2 |

TABLE 1-continued

| TBK, a [°C.] | Oxidation of n-hexane | | | | | | | |
|---|---|---|---|---|---|---|---|---|
| | TAB | | | | TAB/CAB | | | |
| | S | IP | CO$_2$ | CO | S | IP | CO$_2$ | CO |
| 700 | 10 | 7 | 50 | 33 | 3 | 0 | 95 | 2 |
| 750 | 5 | 2 | 65 | 28 | 2 | 0 | 97 | 1 |
| 800 | 2 | 0 | 76 | 22 | 2 | 0 | 98 | 0 |

Pollutant: n-hexane
Pollutant concentration: 1000 ppm
Flow rate: 95 Nm$^3$/h
Catalyst: KCO-1922 K/M

TABLE 2

| TBK, a [°C.] | Oxidation of n-hexane | | | | | | | |
|---|---|---|---|---|---|---|---|---|
| | TAB | | | | TAB/CAB | | | |
| | S | IP | CO$_2$ | CO | S | IP | CO$_2$ | CO |
| 400 | 40 | 35 | 10 | 15 | 29 | 22 | 38 | 2 |
| 450 | 43 | 26 | 12 | 19 | 17 | 18 | 63 | 2 |
| 500 | 20 | 24 | 21 | 25 | 10 | 10 | 78 | 2 |
| 550 | 16 | 9 | 36 | 39 | 7 | 3 | 88 | 2 |
| 600 | 8 | 2 | 62 | 28 | 5 | 2 | 91 | 2 |
| 650 | 4 | 0 | 78 | 18 | 3 | 0 | 95 | 2 |
| 700 | 3 | 0 | 86 | 11 | 3 | 0 | 96 | 1 |
| 750 | 2 | 0 | 90 | 8 | 2 | 0 | 97 | 0 |

Pollutant: n-hexane
Pollutant concentration: 1000 ppm
Flow rate: 73 Nm$^3$/h
Catalyst: KCO-1922 K/M

TABLE 3

| TBK, a [°C.] | Oxidation of n-hexane | | | | | | | |
|---|---|---|---|---|---|---|---|---|
| | TAB | | | | TAB/CAB | | | |
| | S | IP | CO$_2$ | CO | S | IP | CO$_2$ | CO |
| 400 | 59 | 11 | 17 | 13 | 22 | 0 | 76 | 2 |
| 450 | 52 | 11 | 21 | 16 | 14 | 0 | 84 | 2 |
| 500 | 31 | 9 | 26 | 34 | 7 | 0 | 91 | 2 |
| 550 | 14 | 5 | 39 | 42 | 4 | 0 | 94 | 2 |
| 600 | 7 | 7 | 53 | 33 | 2 | 0 | 97 | 1 |
| 650 | 4 | 4 | 72 | 20 | 1 | 0 | 98 | 1 |
| 700 | 2 | 0 | 86 | 12 | 1 | 0 | 99 | 0 |
| 750 | 1 | 0 | 89 | 10 | 0 | 0 | 100 | 0 |

Pollutant: n-hexane
Pollutant concentration: 1000 ppm
Flow rate: 73 Nm$^3$/h
Catalyst: KCO-3366 K/M

TABLE 4

| TBK, a [°C.] | Oxidation of benzene | | | | | | | |
|---|---|---|---|---|---|---|---|---|
| | TAB | | | | TAB/CAB | | | |
| | S | IP | CO$_2$ | CO | S | IP | CO$_2$ | CO |
| 100 | 100 | 0 | 0 | 0 | 100 | 0 | 0 | 0 |
| 150 | | | | | 88 | 0 | 12 | 0 |
| 200 | | | | | 22 | 0 | 78 | 0 |
| 250 | | | | | 10 | 0 | 90 | 0 |
| 300 | | | | | 6 | 0 | 94 | 0 |
| 350 | | | | | 3 | 0 | 97 | 0 |
| 400 | | | | | 1 | 0 | 99 | 0 |
| 450 | | | | | 0 | 0 | 100 | 0 |
| 500 | 550 | | | | | | | |
| 600 | | | | | | | | |
| 650 | 100 | 0 | 0 | 0 | | | | |
| 700 | 91 | 2 | 4 | 4 | | | | |
| 750 | 1 | 0 | 33 | 66 | | | | |
| 800 | 0 | 0 | 95 | 5 | | | | |
| 850 | 0 | 0 | 100 | 0 | 0 | 0 | 100 | 0 |

Pollutant: benzene
Pollutant concentration: 1000 ppm
Catalyst Space Velocity: 20 Nm$^3$/h/l of catalyst
Catalyst: KCO-WK-220 ST The first treatment stage 4 was indirectly heated.

TABLE 5

| TBK, a [°C.] | Oxidation of acetic acid methyl ester | | | | | | | |
|---|---|---|---|---|---|---|---|---|
| | TAB | | | | TAB/CAB | | | |
| | S | IP | CO$_2$ | CO | S | IP | CO$_2$ | CO |
| 100 | 100 | 0 | 0 | 0 | 100 | 0 | 0 | 0 |
| 150 | | | | | 96 | 0 | 4 | 0 |
| 200 | | | | | 86 | 4 | 10 | 0 |
| 250 | | | | | 67 | 3 | 30 | 0 |
| 300 | | | | | 40 | 2 | 58 | 0 |
| 350 | | | | | 20 | 1 | 79 | 0 |
| 400 | 100 | 0 | 0 | 0 | 9 | 0 | 91 | 0 |
| 450 | 99 | 1 | 0 | 0 | 2 | 0 | 98 | 0 |
| 500 | 98 | 1 | 1 | 0 | 0 | 0 | 100 | 0 |
| 550 | 96 | 2 | 2 | 0 | | | | |
| 600 | 94 | 3 | 3 | 0 | | | | |
| 650 | 90 | 4 | 3 | 3 | | | | |
| 700 | 54 | 4 | 6 | 36 | | | | |
| 750 | 7 | 0 | 16 | 77 | | | | |
| 800 | 0 | 0 | 96 | 4 | | | | |
| 850 | 0 | 0 | 100 | 0 | 0 | 0 | 100 | 0 |

Pollutant: acetic acid methyl ester
Pollutant concentration: 2100 ppm
Catalyst Space Velocity: 20 Nm$^3$/h/l of catalyst
Catalyst: KCO-WK-220 ST The first treatment stage 4 was indirectly heated.

TABLE 6

| TBK, a [°C.] | Oxidation of benzene | | | | | | | |
|---|---|---|---|---|---|---|---|---|
| | TAB | | | | TAB/CAB | | | |
| | S | IP | CO$_2$ | CO | S | IP | CO$_2$ | CO |
| 400 | 59 | 0 | 31 | 10 | 7 | 0 | 93 | 0 |
| 450 | 57 | 0 | 31 | 12 | 5 | 0 | 95 | 0 |
| 500 | 53 | 0 | 33 | 14 | 4 | 0 | 96 | 0 |
| 550 | 46 | 0 | 37 | 17 | 2 | 0 | 98 | 0 |
| 600 | 35 | 0 | 40 | 25 | 1 | 0 | 99 | 0 |
| 650 | 27 | 0 | 45 | 28 | 0 | 0 | 100 | 0 |
| 700 | 19 | 0 | 69 | 12 | | | | |
| 750 | 12 | 0 | 82 | 6 | | | | |
| 800 | 4 | 0 | 93 | 3 | 0 | 0 | 100 | 0 |

Pollutant: benzene
Pollutant concentration: 900 ppm
Flow rate: 75 Nm$^3$/h
Catalyst: KCO-WK-220 ST

TABLE 7

| TBK, a [°C.] | Oxidation of acetic acid methyl ester | | | | | | | |
|---|---|---|---|---|---|---|---|---|
| | TAB | | | | TAB/CAB | | | |
| | S | IP | CO$_2$ | CO | S | IP | CO$_2$ | CO |
| 400 | 57 | 7 | 28 | 8 | 17 | 0 | 83 | 0 |
| 450 | 54 | 8 | 28 | 10 | 14 | 0 | 86 | 0 |
| 500 | 46 | 13 | 26 | 15 | 10 | 0 | 90 | 0 |
| 550 | 34 | 19 | 26 | 21 | 5 | 0 | 95 | 0 |
| 600 | 22 | 9 | 35 | 34 | 2 | 0 | 98 | 0 |
| 650 | 15 | 3 | 48 | 34 | 1 | 0 | 99 | 0 |
| 700 | 10 | 1 | 66 | 23 | 0 | 0 | 100 | 0 |
| 750 | 6 | 0 | 89 | 5 | 0 | 0 | 100 | 0 |
| 800 | 2 | 0 | 98 | 1 | 0 | 0 | 100 | 0 |

Pollutant: acetic acid methyl ester
Pollutant concentration: 2200 ppm
Flow rate: 75 Nm$^3$/h
Catalyst: KCO-WK-220 ST

TABLE 8

| TBK, a [°C.] | Oxidation of n-hexane | | | | | | | |
|---|---|---|---|---|---|---|---|---|
| | TAB | | | | TAB/CAB | | | |
| | S | IP | CO$_2$ | CO | S | IP | CO$_2$ | CO |
| 400 | 52 | 10 | 19 | 19 | 7 | 0 | 93 | 0 |
| 450 | 47 | 10 | 23 | 20 | 7 | 0 | 93 | 0 |
| 500 | 42 | 13 | 19 | 26 | 5 | 0 | 95 | 0 |
| 550 | 28 | 3 | 27 | 42 | 3 | 0 | 97 | 0 |
| 600 | 12 | 1 | 47 | 40 | 0 | 0 | 100 | 0 |
| 650 | 6 | 0 | 69 | 25 | | | | |
| 700 | 3 | 0 | 87 | 10 | | | | |
| 750 | 2 | 0 | 92 | 6 | | | | |

TABLE 8-continued

| TBK, a | Oxidation of n-hexane | | | | | | | |
|---|---|---|---|---|---|---|---|---|
| | TAB | | | | TAB/CAB | | | |
| [°C.] | S | IP | $CO_2$ | CO | S | IP | $CO_2$ | CO |
| 800 | 2 | 0 | 94 | 4 | 0 | 0 | 100 | 0 |

Pollutant: n-hexane
Pollutant concentration: 1000 ppm
Flow rate: 75 $Nm^3/h$
Catalyst: KCO-WK-220 ST Good results were also obtained with mixtures of pollutants which were treated in accordance with the process of the present invention. Surprisingly, for such a treatment the burner temperature could be lowered even below those temperatures which were determined to be the lower limit temperatures during the treatment of the individual components.

A further variant of the process resides in not treating a portion of the waste gases in the first stage, but instead passing that portion around the first stage in a by-pass. In an installation according to FIG. 1, this by-pass can be designed, e.g., as a directly connecting line between line 1 and the line 8/A and/or 8/B, whereby this line can in addition contain a conventional means to regulate the flow therethrough. It has proved advantageous to lead up to about 60% by volume, especially up to about 50% by volume of the total waste gas stream through this by-pass.

What is claimed is:

1. A process for the treatment of a waste gas to reduce the concentration of primary and secondary pollutants which are capable of oxidation, comprising the steps of:
    subjecting the exhaust gas in a first stage to thermal afterburning with the application of energy from an external source, in order to partially oxidize the gas; and
    catalytically treating the partially oxidized gas from said first stage by exposure to a catalyst comprising a precious metal;
    the concentration of primary pollutants being reduced to residual level not exceeding 300 $mg/m^3$ and the concentration of secondary pollutants being reduced to a residual level not exceeding 100 $mg/m^3$ of carbon monoxide, where the $m^3$ are normal $m^3$.

2. A process as defined in claim 1, further comprising the step of recovering heat from the heated waste gas either before or after said catalytic treatment step.

3. A process as defined in claim 2, wherein said heat recovery step precedes said catalytic treatment step.

4. A process as defined in claim 2, wherein said heat recovery step follows said catalytic treatment step.

5. A process as defined in claim 2, wherein said heat recovery step both precedes and follows said catalytic treatment step.

6. A process as defined in claim 1, wherein said primary pollutant comprises n-hexane.

7. A process as defined in claim 6, wherein the temperature of said heating step ranges from 540° to 600° C.

8. A process as defined in claim 1, wherein said primary pollutant comprises at least one member of the group consisting of a saturated aliphatic hydrocarbon, an unsaturated aliphatic hydrocarbon, an aromatic hydrocarbon, a naphthenic hydrocarbon, an aliphatic alcohol, a hydroxy substituted aromatic, an ether, an aldehyde, a ketone, an ester, an organic acid and an organic acid anhydride.

9. A process as defined in claim 1, wherein said thermal afterburning in said first stage is at a temperature of at least 600° C.

10. A process as defined in claim 1, wherein the catalyst in said catalytic treatment step comprises a combination of a precious metal catalyst and a metal oxide.

11. A process as defined in claim 1, wherein said thermal afterburning in said first stage is at a temperature of at least 540° C.

* * * * *